United States Patent
Cordeiro et al.

(10) Patent No.: US 9,456,462 B2
(45) Date of Patent: Sep. 27, 2016

(54) METHOD, APPARATUS AND SYSTEM OF FRAME TUNNELING OPERATION OF MULTIPLE FREQUENCY BANDS DEVICE

(75) Inventors: Carlos Cordeiro, Portland, OR (US); Adrian P. Stephens, Cambridge (GB)

(73) Assignee: INTEL CORPORATION, Santa Clara, CA (US)

(*) Notice: Subject to any disclaimer, the term of this patent is extended or adjusted under 35 U.S.C. 154(b) by 413 days.

(21) Appl. No.: 13/992,357

(22) PCT Filed: Dec. 14, 2011

(86) PCT No.: PCT/US2011/064840
§ 371 (c)(1),
(2), (4) Date: Mar. 24, 2014

(87) PCT Pub. No.: WO2012/173649
PCT Pub. Date: Dec. 20, 2012

(65) Prior Publication Data
US 2014/0192714 A1    Jul. 10, 2014

Related U.S. Application Data

(60) Provisional application No. 61/497,174, filed on Jun. 15, 2011.

(51) Int. Cl.
*H04W 76/02*    (2009.01)
(52) U.S. Cl.
CPC ......... *H04W 76/023* (2013.01); *H04W 76/022* (2013.01)
(58) Field of Classification Search
None
See application file for complete search history.

(56) References Cited

U.S. PATENT DOCUMENTS

| | | | |
|---|---|---|---|
| 2006/0050708 A1* | 3/2006 | Shapiro | H04L 1/1664 370/394 |
| 2010/0034159 A1 | 2/2010 | Shin et al. | |
| 2011/0034127 A1* | 2/2011 | Wentink | H04W 76/022 455/41.2 |
| 2011/0090887 A1 | 4/2011 | Kim et al. | |
| 2011/0103233 A1 | 5/2011 | Shu et al. | |

FOREIGN PATENT DOCUMENTS

WO    2012/173649 A1    12/2012

OTHER PUBLICATIONS

International Search Report and Written Opinion received for PCT Patent Application No. PCT/US2011/064840, mailed on Jul. 30, 2012, 9 pages.
International Preliminary Report on Patentability and Written Opinion received for PCT Patent Application No. PCT/US2011/064840, mailed on Jan. 3, 2014, 6 pages.

* cited by examiner

*Primary Examiner* — Ian N Moore
*Assistant Examiner* — Latresa McCallum
(74) *Attorney, Agent, or Firm* — Ellis B. Ramirez; PRASS LLP

(57) ABSTRACT

Disclosed is a tunneling mechanism that enables frames generated by a MAC layer management entity (MLME) to be transmitted by another. By doing that, a pair of stations (STAs) can perform functions such as (re)association, authentication, and the like, without having to transmit frames over-the-air but, instead, use a different MLME for this purpose. This enables the station management entities (SMEs) of a pair of multi-band capable STAs to provide a seamless fast session transfer (FST), including the provisioning of multi-band (de)authentication and (re)association.

13 Claims, 4 Drawing Sheets

METHOD, APPARATUS AND SYSTEM OF FRAME TUNNELING OPERATION OF MULTIPLE FREQUENCY BANDS DEVICE

CROSS-REFERENCES TO RELATED APPLICATIONS

This application claims priority to U.S. Provisional Application No. 61/497,174, entitled "METHOD, APPARATUS AND SYSTEM OF FRAME TUNNELING OPERATION OF MULTIPLE FREQUENCY BANDS DEVICE." filed Jun. 15, 2011, the entire disclosure of which is incorporated herein by reference in its entirety.

BACKGROUND

1. Field of the Disclosed Embodiments

The disclosure relates to wireless communication and, more particularly to a system and method for establishing a fast session transfer (FST) in WLAN and WPAN wireless systems.

2. Introduction

A personal wireless area network (WPAN) is a network used for communication among computing devices (for example, personal devices such as telephones and personal digital assistants) close to one person. The reach of a WPAN may be a few meters. WPANs may be used for interpersonal communication among personal devices themselves, or for connecting via an uplink to a higher level network, for example, the Internet.

The millimeter-wave WPAN and/or mm Wave network may allow very high data rates (e.g., over 2 Gigabit per second (Gbps)) applications such as high speed Internet access, streaming content download (e.g., video on demand, high-definition television (HDTV), home theater, etc.), real time streaming and wireless data bus for cable replacement.

A number of wireless devices today claim to be multi-band. This term is commonly used to refer to devices that support operation in multiple frequency bands, such as 2.4 GHz, 5 GHz, cellular bands, among others. Although these devices are multi-band from a frequency band point of view, from a radio implementation and system integration perspective the operation across the supported frequency bands are completely independent. In other words, there is no means for information/resource sharing and for seamless transfer of communication at the data link level.

To address this problem, the Wireless Gigabit Alliance (WiGig) and the Institute of Electrical and Electronics Engineers (IEEE) 802.11ad Task Group have defined a multi-band operation mechanism that allows integration and seamless operation across different frequency bands and channels. This multi-band mechanism, also known as fast session transfer (FST), is becoming a key component in future generation 60 GHz based systems, and is expected to significantly improve the user experience by offering real-time integration at the data link level between different WiGig-based and IEEE 802.11-based technologies.

However, in order to implement the multi-band mechanism currently being defined in SIGs and standardization bodies, a significant change is necessary in the design and implementation of a device architecture that can support such multi-band operation. This is required so that effective sharing and exchange of information between different data link layer technologies can be provided, and also to offer a mechanism whose operation is completely transparent to higher layer protocols such as IP.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DISCLOSED EMBODIMENTS

Figure 1:
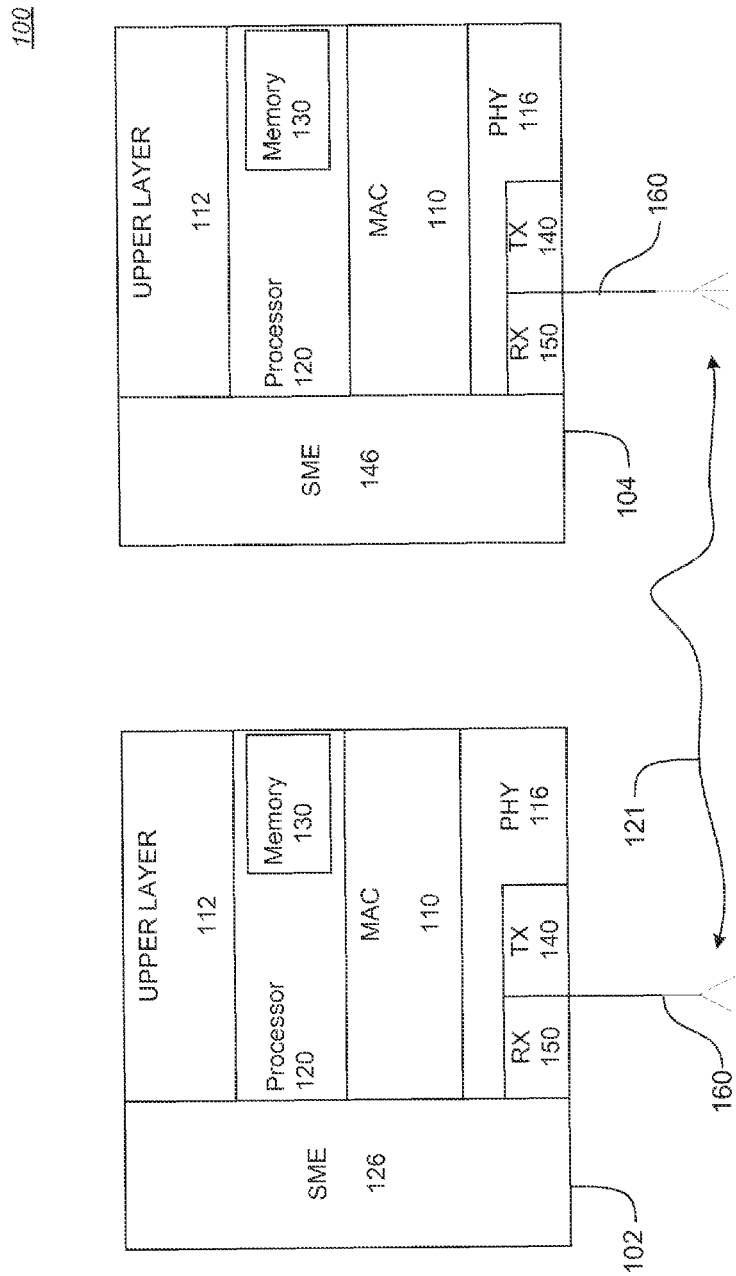
FIG. 1 is a schematic block diagram of a wireless communication system in accordance to an embodiment.

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Although embodiments of the invention are not limited in this regard, discussions utilizing terms such as, for example, "processing." "computing." "calculating," "determining," "applying," "receiving," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of resistors" may include two or more resistors.

The term "controller" is used herein generally to describe various apparatus relating to the operation of one or more device that directs or regulates a process or machine. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

The term PBSS control point (PCP) as used herein, is defined as a station (STA) that operates as a control point of the mm Wave network.

The term access point (AP) as used herein, is defined as any entity that has STA functionality and provides access to the distribution services, via the wireless medium (WM) for associated STAs.

The term "wireless network controller" as used herein, is defined as a station that operates as the PCP and/or as the AP of the wireless network.

The term directional band (DBand) as used herein is defined as any frequency band wherein the Channel starting frequency is above 45 GHz.

The term DBand STA as used herein is defined as a STA whose radio transmitter is operating on a channel that is within the DBand.

The term personal basic service set (PBSS) as used herein is defined as a basic service set (BSS) which forms an ad hoc self-contained network, operates in the DBand, includes one PBSS control point (PCP), and in which access to a distribution system (DS) is not present but an intra-PBSS forwarding service is optionally present.

The term scheduled service period (SP) as used herein is scheduled by a quality of service (QoS) AP or a PCP. Scheduled SPs may start at fixed intervals of time, if desired.

The terms "traffic" and/or "traffic stream(s)" as used herein, are defined as a data flow and/or stream between wireless devices such as STAs. The term "session" as used herein is defined as state information kept or stored in a pair of stations that have an established a direct physical link (e.g., excludes forwarding); the state information may describe or define the session.

The term "wireless device" as used herein includes, for example, a device capable of wireless communication, a communication device capable of wireless communication, a communication station capable of wireless communication, a portable or non-portable device capable of wireless communication, or the like. In some embodiments, a wireless device may be or may include a peripheral device that is integrated with a computer, or a peripheral device that is attached to a computer. In some embodiments, the term "wireless device" may optionally include a wireless service.

Embodiments of the invention may provide devices, systems and methods to schedule a service period in mm Wave network. For example, a PCP of the mm Wave network is able to set a start time of a service period wherein, the start time is no less than a predefined time after transmitting the PCP an information element containing the service period scheduling information, although the scope of the present invention is not limited to these examples.

It should be understood that the present invention may be used in a variety of applications. Although the present invention is not limited in this respect, the circuits and techniques disclosed herein may be used in many apparatuses such as stations of a radio system. Stations intended to be included within the scope of the present invention include, by way of example only, WLAN stations, wireless personal network (WPAN), and the like.

Types of WPAN/WLAN stations intended to be within the scope of the present invention include, although are not limited to, stations capable of operating as a multi-band stations, stations capable of operating as PCP, stations capable of operating as an AP, stations capable of operating as DBand stations, mobile stations, access points, stations for receiving and transmitting spread spectrum signals such as, for example, Frequency Hopping Spread Spectrum (FHSS), Direct Sequence Spread Spectrum (DSSS), Complementary Code Keying (CCK), Orthogonal Frequency-Division Multiplexing (OFDM) and the like.

Some embodiments may be used in conjunction with various devices and systems, for example, a video device, an audio device, an audio-video (AN) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a display, a flat panel display, a Personal Media Player (PMP), a digital video camera (DVC), a digital audio player, a speaker, an audio receiver, an audio amplifier, a data source, a data sink, a Digital Still camera (DSC), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an onboard device, an off-board device, a hybrid device, a vehicular device, a non-vehicular device, a mobile or portable device, a consumer device, a non-mobile or non-portable device, a wireless communication station, a wireless communication device, a wireless AP, a wired or wireless router, a wired or wireless modem, a wired or wireless network, a wireless area network, a Wireless Video Are Network (WVAN), a Local Area Network (LAN), a WLAN, a PAN, a WPAN, devices and/or networks operating in accordance with existing Wireless HDTM and/or Wireless-Gigabit-Alliance (WGA) specifications and/or future versions and/or derivatives thereof, devices and/or networks operating in accordance with existing IEEE802.11 (IEEE 802.11-2007: Wireless LAN Medium Access Control (MAC) and Physical Layer (PHY) Specifications) standards and amendments ("the IEEE 802.11 standards"), IEEE 802.16 standards, and/or future versions and/or derivatives thereof, units and/or devices which are part of the above networks, one way and/or two-way radio communication systems, cellular radio-telephone communication systems, Wireless-Display (WiDi) device, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), ExtendedTDMA (E-TDMA), General Packet Radio Service (GPRS), extended GPRS. Code-Division Multiple Access (CDMA), Wideband CDMA (WCDMA), CDMA 2000, single carrier CDMA, multi-carrier CDMA, Multi-Carrier Modulation (MDM), Discrete Multi-Tone (DMT), Bluetooth®, Global Positioning System (GPS), Wi-Fi, Wi-Max. ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

Some embodiments may be used in conjunction with suitable limited range or short-range wireless communication networks, for example, "piconets", e.g., a wireless area network, a WVAN, a WPAN, and the like.

The WiGig and IEEE802.11 ad specifications have defined a multi-band operation mechanism that allows integration and seamless operation across different frequency bands and channels. This multi-band mechanism, also known as fast session transfer (FST), is expected to become a key component in future generation Wi-Fi based wireless systems given: 1) The proliferation of frequency bands where Wi-Fi operates and will operate. 2) The significantly improved user experience that FST may provide, due to its seamless and fast transfer of session between any two bands/channels.

However, in order to realize the main goals of FST, namely, seamless and fast operation, the multi-band mechanism needs to allow a multi-band capable STA to perform functions such as (re)association, authentication, disassociation, resource management, etc., across bands/channels. Only with such support can a pair of STAs setup their radio interfaces (i.e., move to the appropriate state) in advance of an FST and once FST takes place, the session can continue where it left off without interruption.

FIG. 1 is a schematic block diagram of a wireless communication system 100 in accordance to an embodiment. The system 100 comprises a pair of multi-band capable stations 102 and 104 such as peer Quality of Service (QSTAs) stations. Although only two stations (STAs) are shown for simplicity, the invention is not limited to any particular number of STAs. Using the first multi-band capable station 102 as an example, each STA includes a station management entity (SME) 126 and 146 having a MAC interface (not shown) for transceiving primitives, a processor 120 to convert between primitives and MAC frames, and a physical layer interface (not shown) to transceive primitive-converted MAC frames. A physical layer (PHY) entity 116 has a MAC interface (not shown) to transceive MAC frames and a physical layer interface on line (not shown) connected to a peer STA PHY entity such as STA 104 to transceive physical layer communications.

Typically, the PHY entities (116 in STA 102 and 104) communicate via a wireless link represented by reference designator 121 through antenna 160 having one or more transmitters 140, one or more receivers 150. Antenna 160 may include an internal and/or external RF antenna, for example, a dipole antenna, a monopole antenna, an omni-directional antenna, an end fed antenna, a circularly polarized antenna, a micro-strip antenna, a diversity antenna, or any other type of antenna suitable for transmitting and/or receiving wireless communication signals, blocks, frames, transmission streams, packets, messages and/or data. In some embodiments, station 110 may include for example one or more processors 120, one or more memory units 130, one or more transmitters 140, one or more receivers 150, and one or more antennas 160. Station 110 may further include other suitable hardware components and/or software components.

Processor 120 may include, for example, a Central Processing Unit (CPU), a Digital Signal Processor (DSP), a microprocessor, a controller, a chip, a microchip, an Integrated Circuit (IC), or any other suitable multi-purpose or specific processor or controller. Processor 120 may, for example, process data received by station 102, and/or process data intended for transmission by station 102.

Memory unit 130 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units Memory unit 130 may, for example, store data received by station 104, and/or store data intended for transmission by station 102 and/or store instructions for carrying out the operation of station 102 including for example embodiments of a method described herein.

Transmitter 140, may include, for example, a wireless Radio Frequency (RF) transmitter able to transmit RF signals, e.g., through antenna 160, and may be capable of transmitting a signal generated by for example a Multi-Stream Multi-Band Orthogonal Frequency Division Modulation (MSMB OFDM) system in accordance with some embodiments of the present invention. Transmitter 140 may be implemented using for example a transmitter, a transceiver, or a transmitter-receiver, or one or more units able to perform separate or integrated functions of transmitting and/or receiving wireless communication signals, blocks, frames, transmission streams, packets, messages and/or data.

Receiver 150 may include, for example, a wireless Radio Frequency (RF) receiver able to receive RF signals, e.g., through antenna 160, and may be capable of receiving a signal generated by for example a Multi-Stream Multi-Band Orthogonal Frequency Division Modulation (MSMB OFDM) system in accordance with some embodiments of the present invention. Receiver 150 may be implemented using for example a receiver, transceiver, or a transmitter-receiver, or one or more units able to perform separate or integrated functions of receiving and/or transmitting/receiving wireless communication signals, blocks, frames, transmission streams, packets, messages and/or data.

Figure 2:
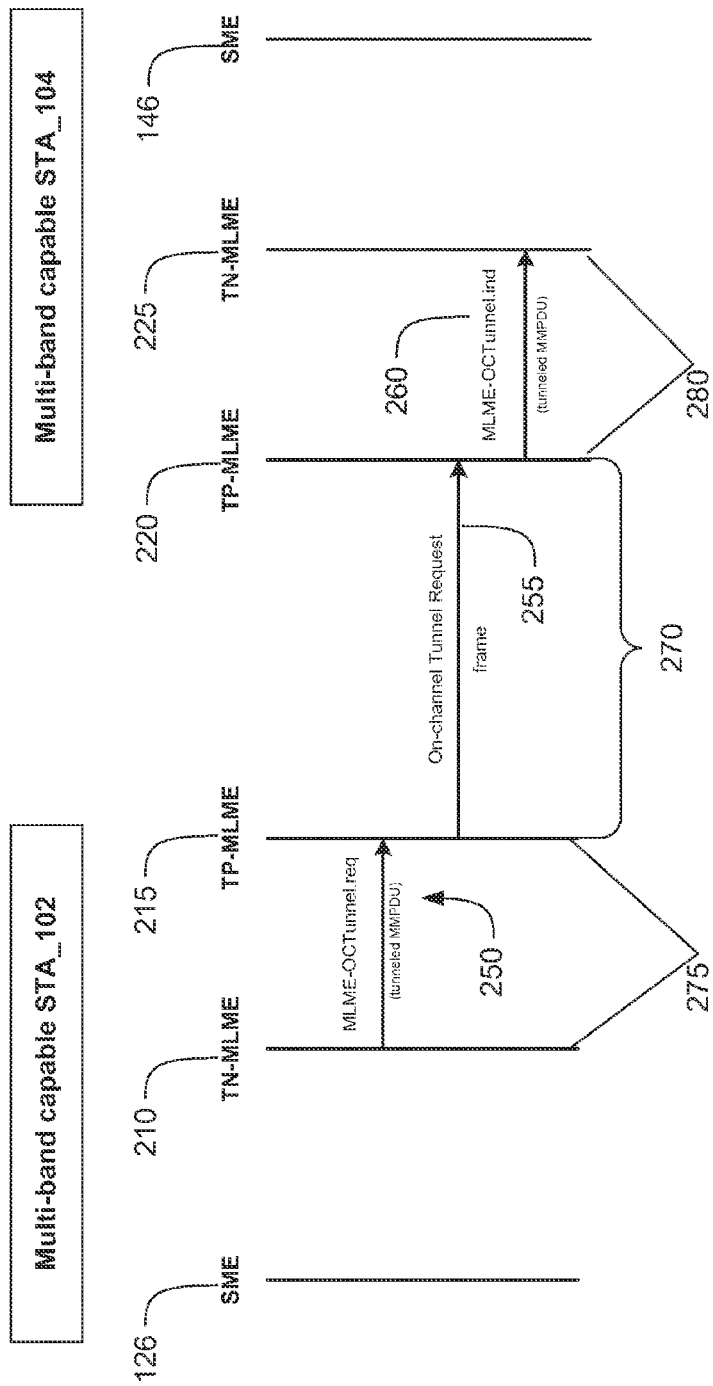
FIG. 2 provides an overview of the concept behind on-channel tunneling operation for multi-band capable stations in accordance to an embodiment.

FIG. 2 provides an overview 200 of the concept behind on-channel tunneling (OCT) operation for multi-band capable stations in accordance to an embodiment.

An initiator MLME that might not be currently enabled to transmit (TN-MLME) such as TN-MLME 210 generates a .request primitive 250 to a local MLME entity that is enabled to transmit (TP-MLME) such as TP-MLME 215. This request carries the contents of a management frame and replaces transmission on-the-air of that frame. The recipient MLME such as TP-MLME 220 generates the .indication primitive 260 to the local MLME entity such as TN-MLME 225 identified in the On-channel Tunnel Request frame 255. The detailed description of the OCT mechanism, with associated frame formats and behavior, is given with reference to FIG. 3 and FIG. 4. Designation 275 is to show that TN-MLME 210 is local to TP-MLME; and designation 260 is to show that TP-MLME 220 is local to TN-MLME 225. Further designation 270 is to show that Station 102 is a peer of station 104. In general, a TP-MLME entity is capable of transmitting or receiving a MAC management protocol data unit (MMPDU). A TN-MLME entity is either the initiator or is the destination of an on-channel tunneled (OCT) MMPDU.

Figure 3:
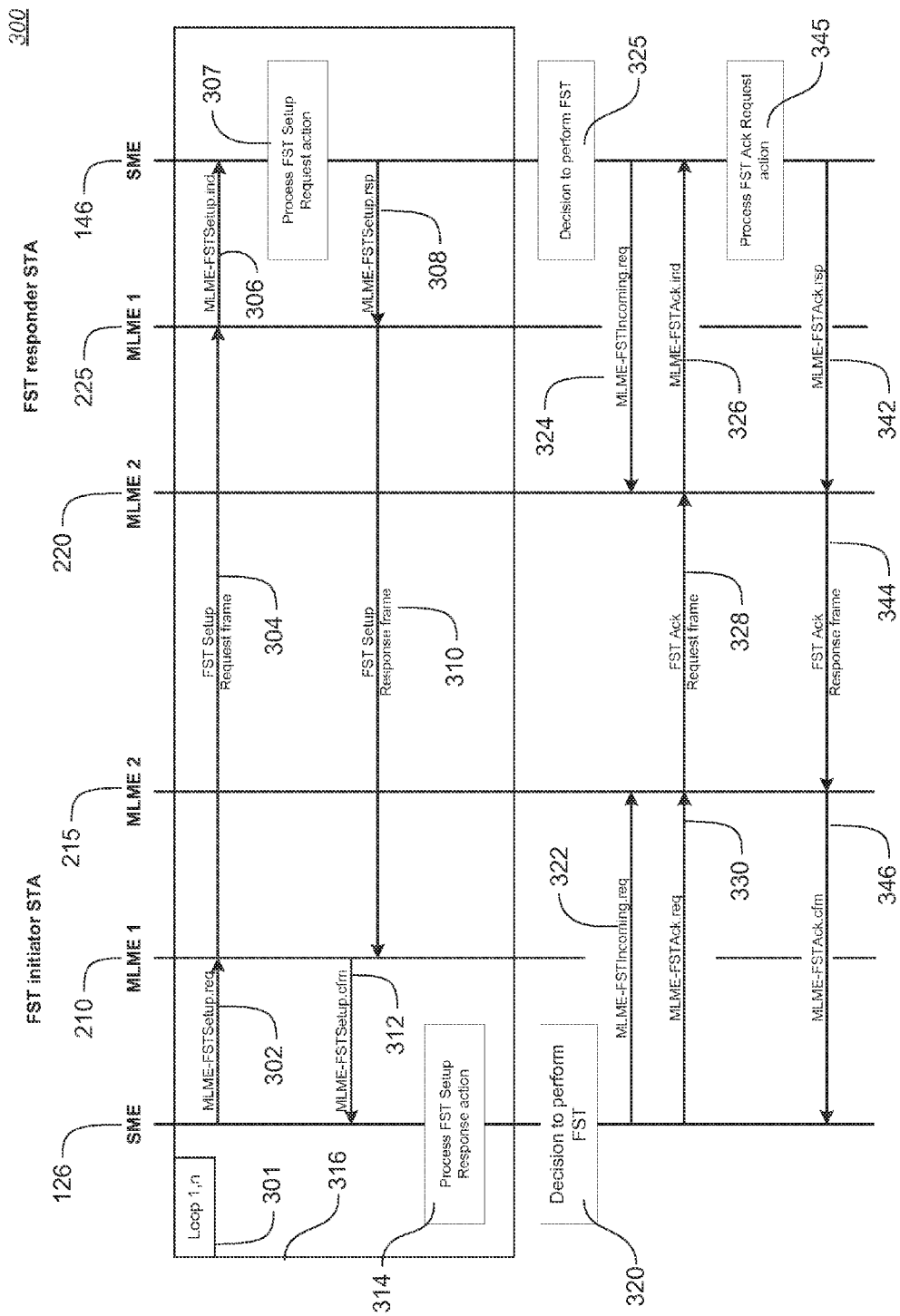
FIG. 3 provides an illustration of a procedure for fast session transfer (FST) protocol setup in a multi-band capable stations environment in accordance to an embodiment.

FIG. 3 provides an illustration of a procedure 300 for fast session transfer (FST) protocol setup in a multi-band capable stations environment in accordance to an embodiment. The multi-band procedures 300 described allow a pair of multi-band capable STAs to discover, synchronize, (de) authenticate, (re)associate, disassociate and manage resources between each other on any common band/channel that is supported by both STAs such as stations 102 and 104. Through the multi-band procedures 300, the SME such as SME 126 and SME 146 of a multi-band capable STA can instruct one of its MLMEs (for SME 126, MLME1 210) to use the on-channel tunneling (OCT) services provided by another MLME (for SME 126, MLME2 215) of the same multi-band capable STA to communicate with a peer MLME (MLME2 220 or MLME1 225) of a peer multi-band capable STA. This enables the SMEs (126 or 146) of a pair of multi-band capable STA to provide a seamless FST, including performing (de)authentication and (re)association across bands/channels. The MLMEs that use the OCT services provided by another MLME within the same multi-band capable STA to communicate are referred to as being on-the-air disabled with respect to each other. Following an FST, two peer on-the-air disabled MLMEs can become on-the-air enabled with respect to each other.

Initial FST setup request is generated by SME 126 and passes to MLME-FSTSetup.req 302, FST Setup Request frame 304, MLME-FSTSetup.ind 306.

The responder station process the FST request action 307 at SME 146 by MLME-FSTSetup.rsp 308. FST Setup Response frame 310, MLME-FSTSetup.cfm 312. SME 126 process FST response action 314.

SME 126 can decide to perform FST 320 or SME 146 can decide to perform FST 325. If SME 126 then MLME-FSTIncoming.req 322 or if SME 146 then MLME-FSTIncoming.req 324. SME 126 acknowledges MLME-FSTAck.req 330, FST Ack Request frame 328. MLME-FSTAck.ind 326. In response SME 146 performs FST acknowledge request action 345 by MLME-FSTAck.rsp 342, FST Ack Response frame 344, MLME-FSTAck.cfm 346.

The procedure 300 of the FST setup protocol that drives the state machine shown in the exchanges between the multi-band stations. The exchanges are examples of the basic procedure and are not meant to be exhaustive of all possible uses of the protocol. In procedure 300, MLME1 210 and MLME2 215 represent any two MLMEs of a multi-band capable STA according to the reference model described. In addition, the parameter n of loop 301 (loop 1, n) corresponds to the number of FST Setup Request and FST Setup Response frame exchanges until both the FST initiator and FST responder successfully move to the Setup completion state.

The SME of both the initiator and responder generates an MLME-FSTIncoming.request primitive (322, 324) that includes the parameters of the FST session transfer. This primitive shall be generated to the MLME associated with the channel number, operating class and band ID specified in the Multi-band element negotiated during the FST session setup. This primitive notifies the MLME of an impending FST session transfer.

For the MLME-FSTIncoming.request (322 and 324) the function primitive parameters are as follows: MLME-FSTIncoming.request (FSTInitiatorAddress, FSTResponderAddress, FSTSetupRequest, FSTSetupResponse, FSTIsInitiator). Where

| Name | Type | Valid Range | Description |
| --- | --- | --- | --- |
| FSTInitiatorAddress | MAC Address | Any valid individual MAC address | Specifies the MAC address of the STA that is the FST initiator. |
| FSTResponderAddress | MAC Address | Any valid individual MAC address | Specifies the MAC address of the STA that is the FST responder. |
| FSTSetupRequest | Sequence of octets | As defined in FST Setup Request frame | Specifies the parameters of the last FST Setup Request frame exchanged between the initiator and responder. |
| FSTSetupResponse | Sequence of octets | As defined in FST Setup Response frame | Specifies the parameters of the last FST Setup Response frame exchanged between the initiator and responder. |
| FSTIsInitiator | Boolean | true, false | Indicates the role that the STA performs in the FST. Set to true if the STA performs in the role of initiator STA, and set to false otherwise. |

For the MLME-FSTAck.req 330 the function primitive parameters are as follows: MLME-FSTAck.request (FSTResponderAddress, FSTAckRequest). Where

| Name | Type | Valid Range | Description |
| --- | --- | --- | --- |
| FSTResponderAddress | MAC Address | Any valid individual MAC address | Specifies the MAC address of the STA to which the FST Ack Request frame is transmitted. |
| FSTAckRequest | Sequence of octets | As defined in FST Ack Request frame | Specifies the parameters of the FST Ack Request. |

For the MLME-FSTAck.ind 326 the function primitive parameters are as follows: (FSTInitiatorAddress, FSTAckRequest). Where

| Name | Type | Valid Range | Description |
| --- | --- | --- | --- |
| FSTInitiatorAddress | MAC Address | Any valid individual MAC address | Specifies the MAC address of the STA from which the FST Ack Request frame was received. |

| Name | Type | Valid Range | Description |
|---|---|---|---|
| FSTAckRequest | Sequence of octets | As defined in FST Ack Request frame | Specifies the parameters of the FST Ack Request. |

For the MLME-FSTAck.cfm 346 the function primitive parameters are as follows: MLME-FSTAck.confirm (FSTResponderAddress, FSTAckResponse). Where

| Name | Type | Valid Range | Description |
|---|---|---|---|
| FSTRespondAddress | MAC Address | Any valid individual MAC address | Specifies the MAC address of the STA from which the FST Ack Response frame was received. |
| FSTAckResponse | Sequence of octets | As defined in FST Ack Response frame | Specifies the parameters of the FST Ack Response. |

Figure 4:
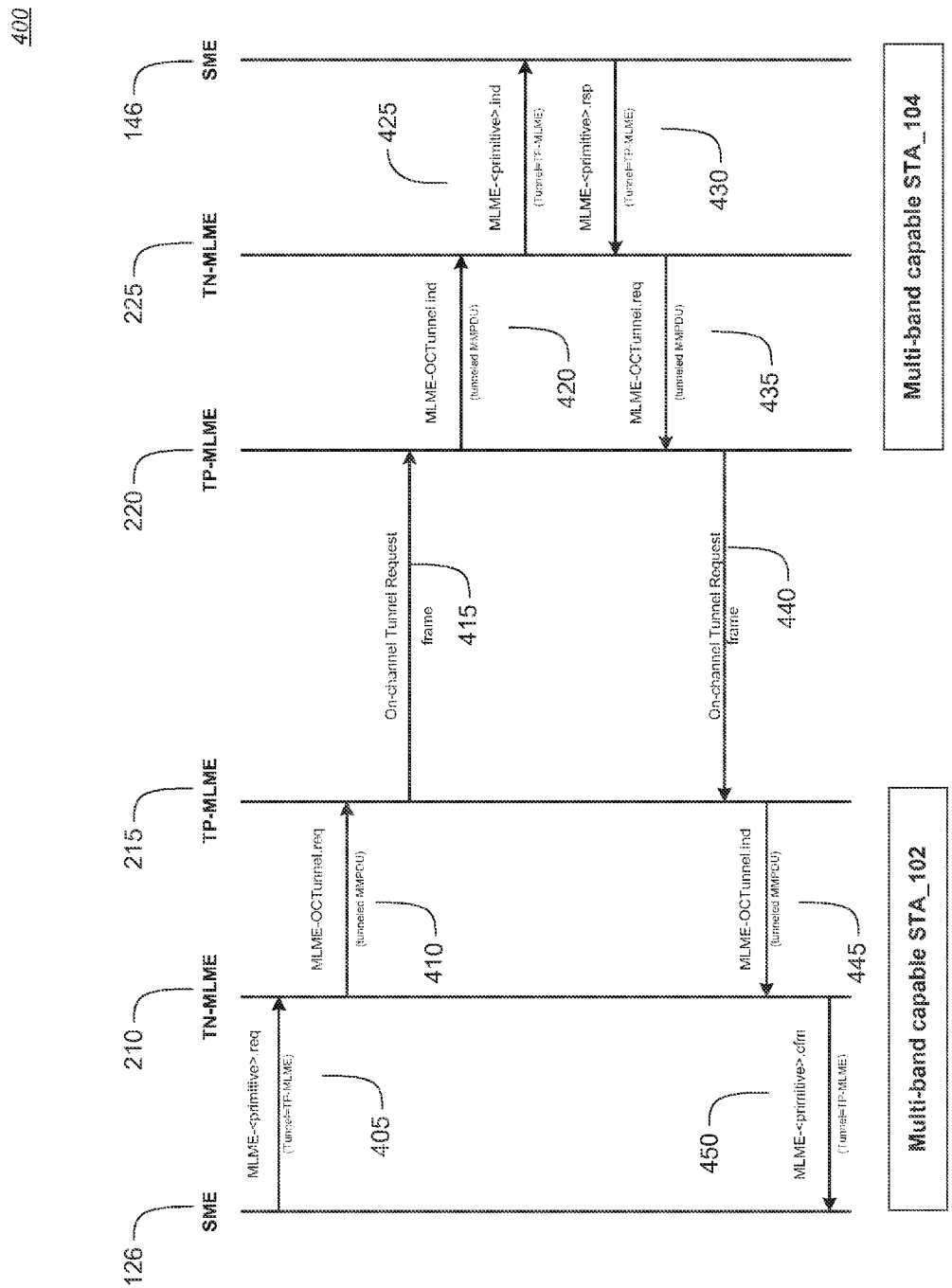
FIG. 4 is a process diagram illustrating how an on-channel tunneling procedure is communicated in a multi-band capable stations environment in accordance to an embodiment.

FIG. 4 is a process diagram illustrating how an on-channel tunneling procedure 400 is communicated in a multi-band capable stations environment in accordance to an embodiment. A multi-band capable STA like STA 102 and STA 4 uses OCT to have one of the STA's on-the-air enabled MLME transmit an MMPDU that was constructed by a different MLME (i.e., one that might be on-the-air disabled) of the same STA. An MMPDU transmitted this way is referred to as an on-channel tunneled (OCT) MMPDU. The MLME that constructs or is the destination of an OCT MMPDU is referred to as tunneled MLME (TN-MLME). The MLME that transmits or receives a tunneled MMPDU over-the-air is referred to as transport MLME (TP-MLME 215).

FIG. 4 depicts the overall OCT procedure. In this figure, a "primitive" refers to the name of any of the MLME primitives that meets all of the following conditions:

Cndt1: Defines either a request, indication, response and confirm primitives, or just request and indication primitives.

Cndt2: Includes a peer Multi-band element. The peer Multi-band element is used to identify the peer Cndt3: Includes a local Multi-band element. The local Multi-band element is used to identify the local TN-MLME 210.

An MLME primitive meeting all of the above conditions is referred to as an OCT MLME primitive. To transmit a tunneled MMPDU, the SME 126 of a multi-band capable STA generates an OCT MLME request primitive 405 that includes the peer Multi-band element and the local Multi-band element.

A TN-MLME 210 receiving an OCT MLME request primitive 405 shall: (1) process the request and construct an OCT MMPDU 410 corresponding to the primitive in question. The TN-MLME shall not transmit any frame as a result of this primitive. (2) Generate an MLME-OCTunnel.request primitive 410 with parameters including the OCT MMPDU and the peer Multi-band element. The MLME-OCTunnel.request primitive 410 shall be generated to the TP-MLME 215 identified by the local Multi-band element which is contained within the OCT MMPDU.

A TP-MLME 215 receiving an MLME-OCTunnel.request primitive 410 shall transmit an On-channel TunnelRequest frame 415 addressed to the peer TP-MLME 220 and which includes the tunneled MMPDU.

When peer TP-MLME 220 receives an On-channel Tunnel Request frame it generates an MLME-OCTunnel.indication primitive 420. The MLME-OCTunnel.indication primitive 420 shall be generated to the TN-MLME 225 identified by the peer Multi-band element contained within the received On-channel TunnelRequest frame. TN-MLME 225 is the local TN-MLME A TN-MLME 225 receiving an MLME-OCTunnel.indication primitive 420 will (1) As defined in this function, process the OCT MMPDU parameter of the primitive as if the MMPDU had been received over-the-air. (2) Generate an OCT MLME indication primitive 425 corresponding to the frame type of tunneled MMPDU. This primitive is generated to the SME 146 of the STA 104, which processes the MMPDU as defined by the function.

In the case of a .request/.indication primitive, the process stops with the receipt of the OCT MLME indication primitive 425 at SME 146. Otherwise, the process continues as described below.

The peer SME 146 responds to the reception of an OCT MLME indication primitive 425 by generating the corresponding OCT MLME response primitive 430. This response includes the peer Multi-band element (TP-MLME 220) and the local Multi-band element (TN-MLME 225).

TN-MLME 225 receiving an OCT MLME response primitive (1) process the response and construct an OCT MMPDU corresponding to the primitive in question. The TN-MLME 225 shall not transmit any frame as a result of this primitive. (2) Generate an MLME-OCTunnel.request primitive 435 with parameters including the OCT MMPDU and the peer Multi-band element. The MLME-OCTunnel.request primitive 435 shall be generated to the TP-MLME 220 identified by the local Multi-band element which is contained within the OCT MMPDU.

TP-MLME 220 receiving an MLME-OCTunnel.response primitive 435 transmits an On-channel Tunnel Request frame 440 addressed to the peer TP-MLME (TP-MLME 215) that includes the tunneled MMPDU.

TP-MLME 215 receiving an On-channel Tunnel Request frame generates an MLME-OCTunnel.indication primitive 445. The MLME-OCTunnel.indication primitive 445 is generated to TN-MLME 210 identified by the peer Multi-band element contained within the received On-channel Tunnel Request frame.

At TN-MLME 210 receiving an MLME-OCTunnel.indication primitive 445 (1) Processes the OCT MMPDU parameter of the primitive as if the MMPDU had been received over-the-air. (2) Generates an OCT MLME confirm primitive 450 corresponding to the frame type of the OCT MMPDU. This primitive is directed to SME 126.

A responder STA and an initiator STA may use the current operating band and channel to perform (re)association on another band and channel supported by the STAs. This is referred to as multi-band (re)association. In addition, if the STAs are performing FST to a channel within the OBand, they may also use the current operating band and channel to perform authentication on the channel within the OBand. This is referred to as multi-band authentication. A responder STA and an initiator STA use the on-channel tunneling operation (see above) mechanism to perform multi-band (re)association and multi-band authentication.

The On-channel Tunnel Request frame is an Action frame of category FST. The On-channel Tunnel Request frame allows a multi-band STA to encapsulate an MMPDU for transmission to an MLME of a peer multi-band STA, which can be used to perform multi-band association and multi-band authentication.

The format of the On-channel Tunnel Request frame Action field is shown below.

| Order | Information |
|---|---|
| 1 | Category |
| 2 | Action |
| 3 | OCT MMPDU |
| 4 | Multi-band |

The Category field is set to the category for FST. The Action field is set to the value for On-channel Tunnel Request. The OCT MMPDU field is defined below.

|  | MMPDU Length | MMPDU Frame Control | MMPDU Frame Body |
|---|---|---|---|
| Octets: | 2 | 2 | Variable |

The MMPDU Length field contains the length in octets of the MMPDU Frame Body field. The MMPDU Frame Control field carries the content of the Frame Control field of an MMPDU that would be constructed if the MMPDU for the corresponding management frame type were transmitted over-the-air. The MMPDU Frame Body field carries the content of the Frame Body field of an MMPDU that would be constructed if the MMPDU for the corresponding management frame type were transmitted over-the air (i.e., all the octets after the MAC header and up to, but not including, the FCS). The Multi-band field contains the Multi-band element of the peer MLME to which the OCT MMPDU is destined to. The channel, frequency band and MAC address contained in this element are used to deliver the OCT MMPDU to the correct MLME within the peer STA.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Embodiments of the present invention provide a non-volatile computer readable medium encoded with computer executable instructions, which when accessed, causes a machine to perform on-channel tunneled operations.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the components each processing the content in various possible ways. It does not necessarily need to be one system used by all end users. Accordingly, the appended claims and their legal equivalents should only define the disclosure, rather than any specific examples given.

We claim:

1. A method of on-channel tunneling (OCT) in a peer to peer direct wireless communication comprising:
    generating by a local tunneled MAC layer management entity (TN-MLME) a request primitive to a transport MAC layer management entity (TP-MLME) that is enabled to transmit, wherein the request primitive carries contents of a management frame and replaces transmission on-the-air of the management frame;
    responding by a peer station management entity (PSME) to the indication primitive from a local MLME by generating a corresponding response primitive, wherein the corresponding response primitive includes a peer Multi-band element and a local Multi-band element;
    generating by a third MLME an indication primitive to a local MLME entity identified in an On-channel Tunnel Request frame, wherein the third MLME is a TP-MLME at a multi-band capable station (STA) that receives the request primitive;
    generating by a MAC layer management entity (MLME) that is not currently enabled to transmit an OCT MLME confirm primitive after receiving parameters passed with an OCT MLME response primitive; and
    processing at a station management entity (SME) of a multi-band capable STA that generated an initial OCT MLME request primitive an OCT MLME confirm primitive.

2. The method according to claim 1, the method further comprising:
    transmitting by the transport MLME (TP-MLME) from the request primitive the on-channel tunnel request frame to the third MLME identified by the local multi-band element, wherein the on-channel tunnel request frame carries the management frame.

3. The method according to claim 2, the method further comprising:

transmitting by the third MLME the indication primitive to the local MLME identified by a peer Multi-band element contained within the on-channel tunnel request frame.

4. The method according to claim 3, the method further comprising:
processing by the local MLME the parameter of the indication primitive as if the management frame had been received over-the-air; and
generating by the local MLME indication primitive corresponding to a frame type of the management frame.

5. The method according to claim 1, wherein a primitive is selected from a group consisting of request, indication, response and confirm primitives, or request and indication primitives.

6. A non-transitory computer-readable medium having instructions that when compiled by a processor provides on-channel tunneling (OCT) in a peer to peer direct wireless communication by:
generating by a local tunneled MAC layer management entity (TN-MLME) a request primitive to a transport MAC layer management entity (TP-MLME) that is enabled to transmit, wherein the request primitive carries contents of a management frame and replaces transmission on-the-air of a management frame; and
generating by a third MLME an indication primitive to a local MLME entity identified in an On-channel Tunnel Request frame, wherein the third MLME is a TP-MLME at a multi-band capable station (STA) that receives the request primitive;
responding by a peer station management entity (PSME) to the indication primitive from a local MLME by generating a corresponding response primitive, wherein the response includes a peer Multi-band element and a local Multi-band element;
generating by a MAC layer management entity (MLME) that is not currently enabled to transmit an OCT MLME confirm primitive after receiving parameters passed with an OCT MLME response primitive; and
processing at an SME of a multi-band capable STA that generated an initial OCT MLME request primitive the OCT MLME confirm primitive.

7. The non-transitory computer-readable medium according to claim 6, further comprising instructions for:
transmitting by the transport MLME (TP-MLME) from the request primitive the on-channel tunnel request frame to the third MLME identified by the local multi-band element, wherein the on-channel tunnel request frame carries the management frame.

8. The non-transitory computer-readable medium according to claim 7, further comprising instructions for:
transmitting by the third MLME an indication primitive to a local MLME identified by a peer Multi-band element contained within the on-channel tunnel request frame.

9. The non-transitory computer-readable medium according to claim 7, further comprising instructions for:
processing by a local MLME the parameter of a indication primitive as if the management frame had been received over-the-air; and
generating by a local MLME indication primitive corresponding to the frame type of the management frame.

10. The non-transitory computer-readable medium according to claim 6, wherein a primitive is selected from a group consisting of request, indication, response and confirm primitives, request and indication primitives.

11. A system comprising:
a memory that stores communication instructions; and
at least one processor that executes communication instructions to cooperate to create an on-channel tunneling (OCT) in a peer to peer direct wireless communication by:
generating by a local tunneled MAC layer management entity (TN-MLME) an MLME-OCTunnel request primitive with parameters including on-channel tunneling MAC management protocol data unit (MMPDU) and peer Multi-band element, wherein the request carries the contents of a management frame and replaces transmission on-the-air of the management frame;
wherein a primitive is selected from a group consisting of request, indication, response and confirm primitives, or request and indication primitives;
transmitting by a third MLME an indication primitive to a local MLME identified by the peer Multi-band element contained within an on-channel tunnel request frame wherein the third MLME is a transport MAC layer management entity (TP-MLME) at a multi-band capable station (STA) that receives the request primitive; an
processing by a local MLME the parameter of the indication primitive as if the management frame had been received over-the-air;
generating by a MAC layer management entity (MLME) that is not currently enabled to transmit an OCT MLME confirm primitive after receiving parameters passed with the OCT MLME response primitive; and
processing at the SME of a multi-band capable STA that generated an initial OCT MLME request primitive the OCT MLME confirm primitive.

12. The system according to claim 11, further comprising communication instructions for:
generating by the third MLME the indication primitive to a local MLME entity identified in the on-channel tunnel request frame; and
transmitting by the transport MLME (TP-MLME) from the request primitive the on-channel tunnel request frame to the third MLME identified by a local multi-band element, wherein the on-channel tunnel request frame carries the management frame.

13. The system according to claim 12, further comprising communication instructions for:
generating by a local MLME indication primitive corresponding to a frame type of a management frame; and
responding by a peer station management entity (PSME) to the local MLME indication primitive from a local MLME by generating a corresponding response primitive, wherein the response includes a peer Multi-band element and the local Multi-band element.

* * * * *